(12) United States Patent
Kishimoto

(10) Patent No.: US 11,334,909 B2
(45) Date of Patent: May 17, 2022

(54) METHOD OF PROVIDING TELEVISION PROGRAM ADVERTISEMENT

(71) Applicant: DENTSU INC., Tokyo (JP)

(72) Inventor: Wataru Kishimoto, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 17/293,457

(22) PCT Filed: Aug. 9, 2019

(86) PCT No.: PCT/JP2019/031655
§ 371 (c)(1),
(2) Date: May 12, 2021

(87) PCT Pub. No.: WO2020/110377
PCT Pub. Date: Jun. 4, 2020

(65) Prior Publication Data
US 2021/0406951 A1    Dec. 30, 2021

(30) Foreign Application Priority Data

Nov. 29, 2018  (JP) .............................. JP2018-223129

(51) Int. Cl.
*H04N 21/262*   (2011.01)
*G06Q 30/02*    (2012.01)
*H04N 21/81*    (2011.01)

(52) U.S. Cl.
CPC ... *G06Q 30/0244* (2013.01); *H04N 21/26241* (2013.01); *H04N 21/812* (2013.01)

(58) Field of Classification Search
CPC ................................................ H04N 21/26241
See application file for complete search history.

(56) References Cited

U.S. PATENT DOCUMENTS

| | | | |
|---|---|---|---|
| 2002/0147638 A1* | 10/2002 | Banerjee | G06Q 30/02 |
| | | | 705/14.53 |
| 2009/0173839 A1* | 7/2009 | Groeneweg | B61L 23/042 |
| | | | 246/15 |
| 2013/0144800 A1* | 6/2013 | Fallows | G06Q 30/0282 |
| | | | 705/341 |

(Continued)

FOREIGN PATENT DOCUMENTS

| | | |
|---|---|---|
| JP | 2006157231 A | 6/2006 |
| JP | 2007265449 A | 10/2007 |

(Continued)

OTHER PUBLICATIONS

International Search Report dated Sep. 17, 2019 for International Patent Application No. PCT/JP2019/031655.

*Primary Examiner* — Michael H Hong

(57) ABSTRACT

[Problem to be solved] An object of the present invention is to provide a method for improving an advertising effect, particularly in a television commercial. [Solution] According to an embodiment of the present invention, the disclosed method is a method for providing an advertisement for a television program, which determines an advertisement-related product related to a product to be advertised, refers supply prediction information of the advertisement-related product, and determines the time for placing the TV program advertisement based on the supply prediction information.

8 Claims, 12 Drawing Sheets

(56) References Cited

U.S. PATENT DOCUMENTS

2014/0201005 A1* 7/2014 Shady ................ G06Q 30/0267
                                                               705/14.64
2014/0297377 A1* 10/2014 Bhat .................. G06Q 30/0276
                                                               705/14.5
2016/0236634 A1* 8/2016 Parks ...................... B60L 53/16

FOREIGN PATENT DOCUMENTS

JP        2020087153 A    6/2020
TW       202020770 A    6/2020

* cited by examiner

Advertisement-related product information 100

| Advertisement ID | Product to be advertised | Advertisement-related product | Reference information 1 | Reference information 2 |
|---|---|---|---|---|
| 1 | Seasoning A | Cabbage | Weather information a | Satellite image information a |
| 2 | Seasoning B | Eggplant | Weather information b | Satellite image information b |
| 3 | Curry roux | Potato | Weather information c | Satellite image information c |
| 4 | Takoyaki no moto | Octopus | Weather information d | N/A |
| 5 | Nabe no moto | Fugu | Weather information e | N/A |
| 6 | Dessert no moto | Milk | Individual identification information a | N/A |
| ... | ... | ... | ... | ... |

FIG. 5

Advertisement information 200

| Advertisement ID | Placement time |
|---|---|
| 1 | February 5th – February 12th |
| 2 | August 8th – August 15th |
| 3 | October 1st - October 8th |
| 4 | July 14th – July 21st |
| 5 | June 5th - June 12th |
| . . . | |

FIG. 6

METHOD OF PROVIDING TELEVISION PROGRAM ADVERTISEMENT

TECHNICAL FIELD

The present invention relates to a method for providing Television program advertisement.

BACKGROUND OF THE INVENTION

Conventionally, it has been known that, for example, weather conditions can be cited as external influencing factors that affect sales of products to be advertised as broadcast on television commercials or distributed through web advertisements. For example, it is well known that it becomes difficult to sell ice cream on chilly weather days even in the summer, and that sales of air conditioners increase on hot summer days.

As an example of television advertisements, a technique is disclosed in which a content of an advertisement is changed in real time in accordance with the latest weather phenomenon to enhance the advertising effect (for example, Patent Document 1).

In addition, as an example of web advertisements, a technology is disclosed that can change advertisements for a product with a high sales effect in real time for each region where a store is located based on a local weather forecast (for example, Patent Document 2).

PRIOR ART DOCUMENTS

Patent Literature

[Patent Document 1] Japanese Unexamined Patent Application Publication No. 2006-157231
[Patent Document 2] Japanese Unexamined Patent Application Publication No. 2007-265449

INVENTION SUMMARY

Problems to be Solved

However, in practice, with respect to television advertisements, even in a case of spot commercials such as campaign advertisements, it takes time to process the commercial to run, and it is difficult to change the content of the advertisements in real time as in the above-described technology.

Moreover, there may be some factors that not only predict demands for products to be advertised, but also potentially have a significant impact on sales of the products to be advertised.

Therefore, an object of the present disclosure is to provide a method for improving an advertising effect particularly in a television commercial.

Solution to the Problems

One embodiment of the present disclosure is a method for providing an advertisement for a TV program, which determines an advertisement-related product related to a product to be advertised, refers to supply prediction information of the advertisement-related product, and based on the supply prediction information, decides the timing of placement of the TV program advertisement.

Effect of the Invention

According to the present disclosure, it is possible to further improve an advertising effectiveness particularly in a television commercial.

BRIEF DESCRIPTION OF DRAWINGS

FIG. 5 is an example of advertisement-related product information by the first embodiment of the present invention.
FIG. 6 is an example of advertisement information by the first embodiment of the present invention.

DETAILED DESCRIPTION OF INVENTION

Contents of embodiments of the present invention will be listed and described. Methods to provide an advertisement for a TV program according to embodiments of the present invention have following configurations.

[Item 1]
A method for providing an advertisement for a television program, comprising:
determining an advertisement-related product related to a product to be advertised;
referring to supply prediction information of the advertisement-related product; and
determining placement time of the television program advertisement based on the supply prediction information.

[Item 2]
The method for providing an advertisement for a television program according to Item 1, wherein the supply prediction information includes information related to price prediction of the advertisement-related product.

[Item 3]
The method for providing an advertisement for a television program according to Item 1, wherein the supply prediction information includes information related to a shipping time of the advertisement-related product.

[Item 4]

The method for providing an advertisement for a television program according to Item 1, wherein the supply prediction information is generated based on reference information.

[Item 5]

The method for providing an advertisement for a television program according to Item 4, wherein the reference information is either weather information or satellite image information.

[Item 6]

The method for providing an advertisement for a television program according to Item 1, wherein the reference information is weather information, and the weather information further refers to satellite image information.

[Item 7]

The method for providing an advertisement for a television program according to item 1, wherein the advertisement-related product is a product used together with the product to be advertised.

[Item 8]

The method for providing an advertisement for a television program according to item 1, wherein the advertisement-related product is an ingredient.

[Item 9]

The method for providing an advertisement for a television program according to item 1, wherein the advertisement-related product is a farm product.

First Embodiment

Figure 1:
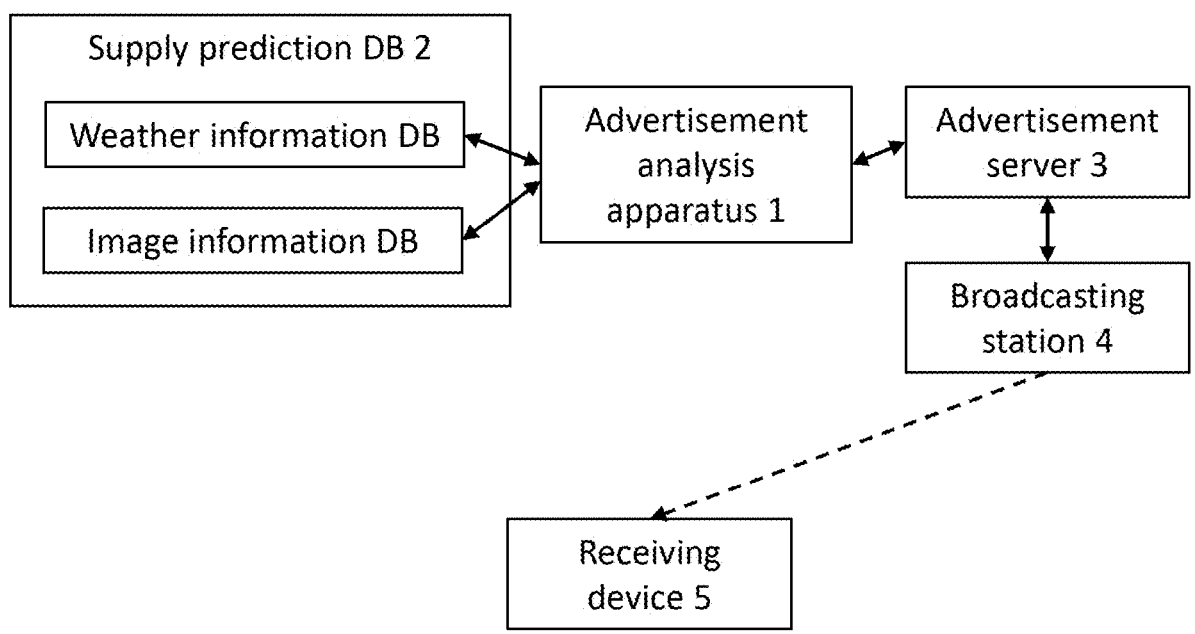
FIG. 1 is a configuration diagram of a system according to a first embodiment of the present invention.

Hereinafter, the method to provide an advertisement for a television program according to the first embodiment of the present invention will be described with references to the drawings. FIG. 1 is a configuration diagram of a system to provide an advertisement for a television program according to a first embodiment of the present invention.

As shown in FIG. 1, a system to provide an advertisement for a television program is comprised of advertisement analysis apparatus 1; a supply prediction DB 2 that is connected to the advertisement analysis apparatus 1 via a network such as the Internet and provides supply prediction information related to an advertisement-related product related to a product to be advertised for a television program such as a television commercial; an advertisement server 3 that is connected to the advertisement analysis apparatus 1 via a network such as the Internet and stores advertisement information for the TV program; a broadcasting station 4 which is connected to the advertisement server 3 via a network such as the Internet and transmits a television program advertisement to a receiving device 5.

For example, the advertisement analysis apparatus 1 may be an advertisement company DMP (Data Management Platform), which analyzes TV program viewing logs provided by the advertising company, viewer purchase data and position information obtained through various receiving terminals related to viewers, and the like. The advertisement analysis apparatus 1 may be a device to cooperate with the DMP. Or, the advertisement analysis apparatus 1 may be another device.

Further, as illustrated in FIG. 1, the supply prediction DB 2 may be provided outside the advertisement analysis apparatus 1 or may store various types of information in the storage or the like of the advertisement analysis apparatus 1. Weather information DB and image information DB, which comprise the supply prediction DB 2, may be information provided by the same business entity or information provided by different entities.

The advertisement server 3 may be any device that has a function of storing information related to television CM, such as information specifying material data of the television CM and the timing of provision. Similar functions can be provided in the advertisement analysis apparatus 1 or the broadcasting station 4. Further, the advertisement server 3 may have, for example, an SSP (Supply Side Platform) that procures advertisements.

For example, the broadcasting station 4 transmits a television program and a television commercial inserted in or between television programs to the receiving device 5 such as a television receiver provided at the viewer's home via a broadcast wave such as terrestrial digital broadcasting. Also, the broadcasting station 4 can transmit a TV program and a TV CM inserted in or between programs to a receiver connected to the Internet via the Internet.

The receiving device 5 may be a television receiving device, a recorder, a smartphone, a tablet, or the like that can receive digital terrestrial broadcast waves, digital satellite broadcast waves, and the like. The receiving device 5 can receive a TV program and a TV CM from the broadcasting station 4 via the Internet by connecting to the Internet. For convenience of explanation, only one receiving device 5 is shown in FIG. 1, but a plurality of receiving devices 5 may be provided.

Further, the devices such as the advertisement analysis apparatus 1, the advertisement server 3, and the broadcasting station 4 may be general-purpose computers such as workstations or personal computers, or may be smartphones, tablets, portable terminals, other information terminals, and the like.

Figure 2:
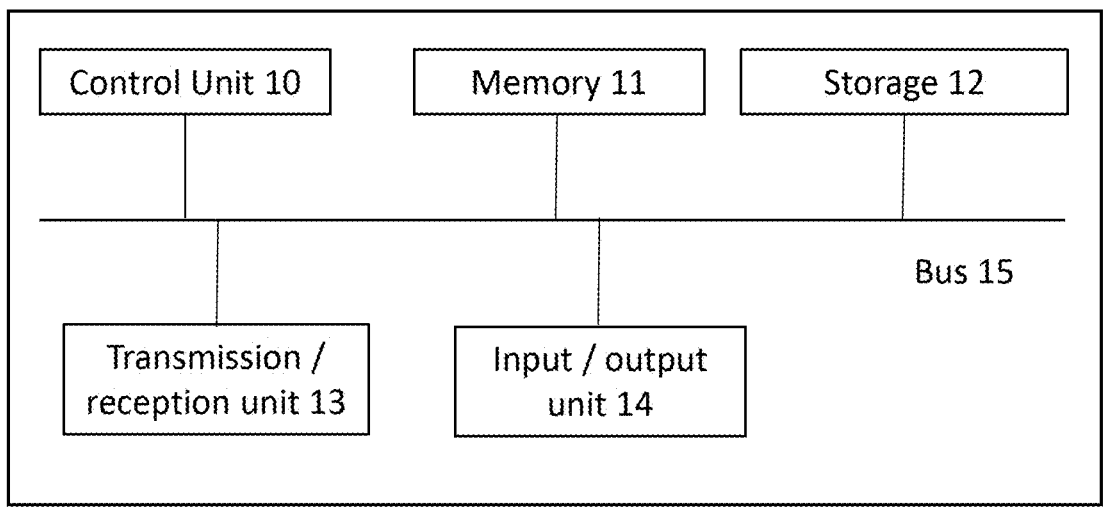
FIG. 2 is a function block diagram of an advertisement analysis apparatus of the first embodiment of the present invention.

FIG. 2 is a functional block diagram of the advertisement analysis apparatus 1 according to the first embodiment of the present invention. The configuration shown in the figure is an example and may have other configurations.

As shown in the figure, the advertisement analysis apparatus 1 is connected to a database (not shown) and forms a part of the system. The advertisement analysis apparatus 1 may be a general-purpose computer such as a workstation or a personal computer or may be logically realized by cloud computing.

The advertisement analysis apparatus 1 includes at least a control unit 10, a memory 11, a storage 12, a transmission/reception unit 13, an input/output unit 14, and the like, which are electrically connected to each other through a bus 15.

The control unit 10 is an arithmetic device that controls the overall operation of the advertisement analysis apparatus 1 and performs data transmission/reception control between each element, information processing necessary for the application execution, and authentication processing. For example, the control unit 10 is a CPU (Central Processing Unit), performing information processing by executing a program or the like stored in the storage 12 and deployed in the memory 11.

The memory 11 includes a main memory comprising of a volatile storage device such as a DRAM (Dynamic Random Access Memory) and the like, and an auxiliary memory comprising of a nonvolatile storage device such as a flash memory or an HDD (Hard Disc Drive) and the like. The memory 11 is used as a work area of the control unit 10 and stores a BIOS (basic input/output system) which is executed at a start-up of advertisement analysis apparatus 1, various setting information, and the like.

The storage 12 stores various programs such as application programs. A database which stores data used for each process may be constructed in the storage 12.

The transmission/reception unit 13 connects the advertisement analysis apparatus 1 to the network. The transmission/reception unit 13 may include an interface that can communicate with the Internet, various mobile communication systems (for example, 4G, 5G mobile communication systems, LTE (Long Term Evolution), etc.), wireless communication networks (for example, WiFi (registered trademark)), and the like. The transmission/reception unit 13 may also include a short-range communication interface such as Bluetooth (registered trademark) and BLE (Bluetooth Low Energy).

The input/output unit 14 may include an information input device such as a keyboard/mouse and an output device such as a display.

The bus 15 is commonly connected to each of the above-described elements, and transmits, for example, an address signal, a data signal, and various control signals.

Figure 3:
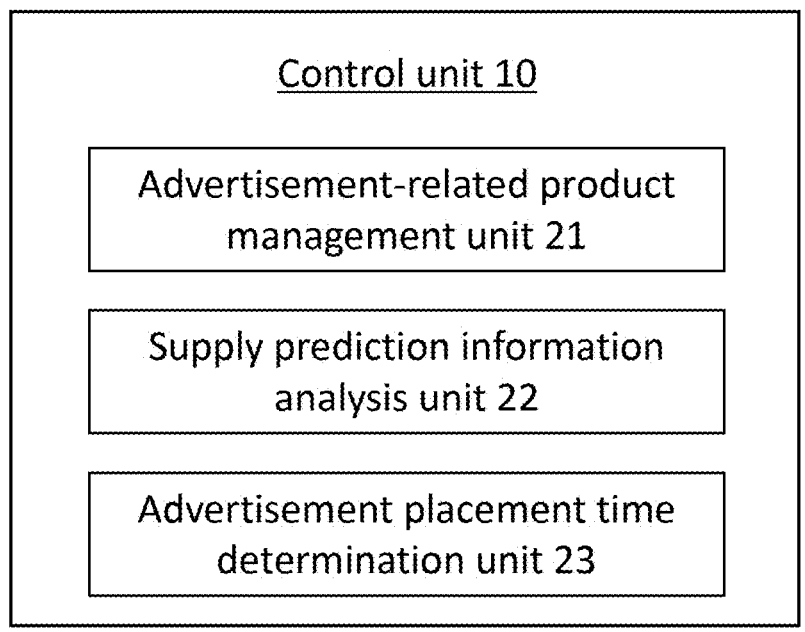
FIG. 3 is the function block diagram which illustrates details of the control unit of the advertisement analysis apparatus by the first embodiment of this invention.
Figure 4:
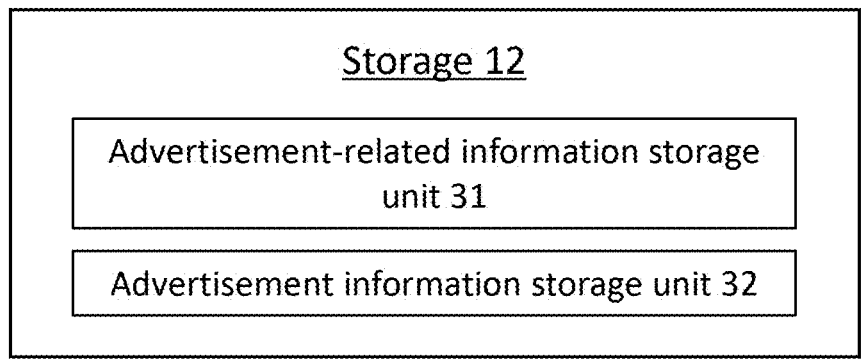
FIG. 4 is a figure which illustrates details of a storage of the advertisement analysis apparatus by the first embodiment of this invention.

FIG. 3 is a functional block diagram showing details of the control unit 10 of the advertisement analysis apparatus 1 according to the first embodiment of the present invention. FIG. 4 is a functional block diagram showing details of the storage 12 of the advertisement analysis apparatus 1 according to the first embodiment of the present invention. As described above, the control unit 10 executes the application program related to the analysis according to the present embodiment, and modules of the executed program are divided into several functional blocks as illustrated. Further, all or a part of the functional blocks executed by the main control unit of the server can be executed by the control unit of another device depending on its nature of the function.

First, an advertisement-related product management unit 21 manages information related to products related to the product to be advertised in the TV CM. For example, when the advertising target product is a "seasoning" of a dish using cabbage as a cooking ingredient, the product related to the product to be advertised is "cabbage". In this example, the advertisement-related product management unit 21 manages information related to cabbage. As shown in FIG. 4, information related to the advertisement-related product can be stored in an advertisement-related information storage unit 31.

A supply prediction information analysis unit 22 analyzes supply prediction of advertisement-related products. The supply prediction information analysis unit 22 can analyze the supply prediction of "cabbage" in the above example. Here, reference information referred for supply prediction is stored in the external supply prediction DB 2. In the context of the "cabbage" example, the reference information may be, for example, weather prediction information related to the weather that affects the growth of cabbage, provided by a weather forecast operator. The reference information may be information related to the satellite image of the cabbage field provided by the satellite operator. However, it may not be limited thereto. The supply prediction information analysis unit 22 analyzes the supply prediction of advertisement-related products based on reference information provided from the inside and the outside. It may also derive the demand forecast for the advertisement-related product by consumers (i.e., viewers of commercials) based on the supply forecast, and further derive the demand forecast for the advertisement product.

FIG. 5 illustrates an example of advertisement-related product information. As illustrated in FIG. 5, for each advertisement ID, the advertisement-related information 100 stores information of products to be advertised, advertisement-related products, and reference information used for supply prediction of the advertisement-related products. For example, when the advertisement ID "1" is related to a product to be advertised "seasoning A", and the advertising-related product related to the seasoning A is "cabbage", then the reference information used for the cabbage supply prediction may be information on cabbage fields. The reference information includes weather forecast information related to the weather that affects cabbage growth and information related to satellite images that provide image data of cabbage fields. As advertisement-related products, vegetables such as "cabbage" can be cited in relation to seasonings for Chinese dishes that use cabbage as an ingredient. As shown in FIG. 5, for example, in relation to the product to be advertised "Takoyaki no Moto", it is a seafood such as "Tako (Octopus)", or in relation to the product to be advertised "Dessert no Moto", it is an animal product such as "milk". In other words, as long as the advertisement-related product is a farm product that is used together with the product to be advertised, regardless of whether it is a vegetable, a seafood, a livestock product, or the like, the supply timing affects the consumer's consumption behavior.

An advertisement placement time determination unit 23 proposes advertisement placement time based on the advertisement-related product supply forecast, that is, the consumer demand forecast. It can store advertisement-related information including information related to the advertisement placement time in the advertisement information storage unit 32 of the storage 12.

FIG. 6 illustrates an example of advertisement information. As shown in FIG. 6, advertisement information 200 stores information related to the advertisement placement time for each advertisement ID. For example, for the advertisement ID "1" (the advertisement related to the product to be advertised "seasoning A"), it stores information related to the advertisement placement time when it was decided that the placement period was appropriate for a week starting from February 5 based on the forecast of the advertisement-related product "cabbage" supply.

Figure 7:
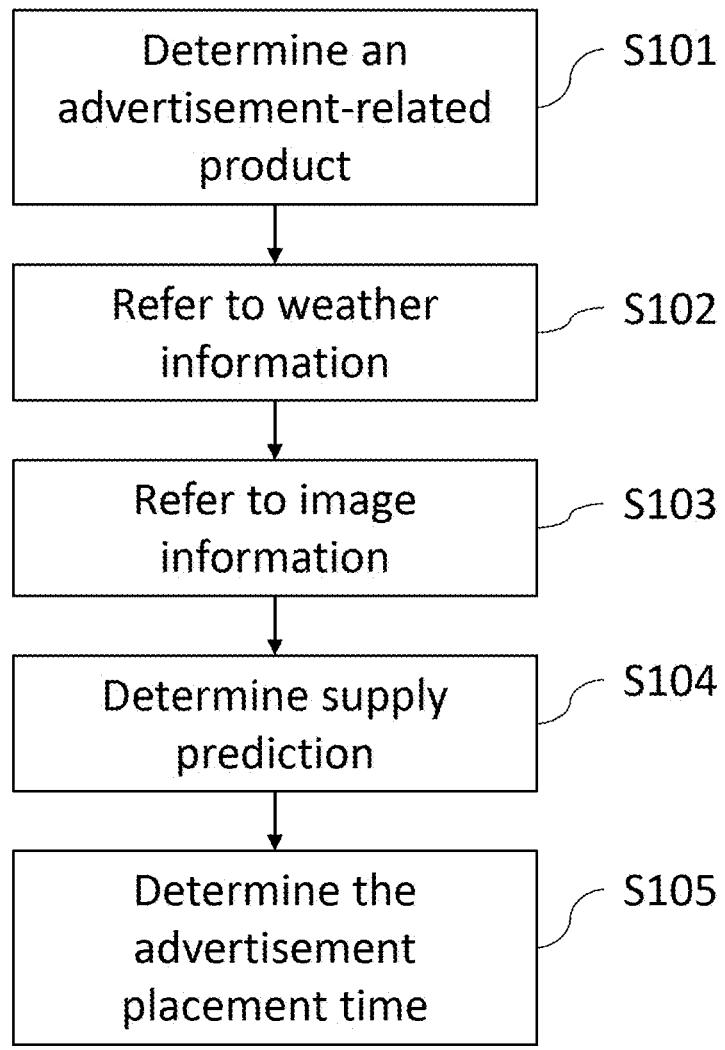
FIG. 7 is a flowchart figure of a method to provide an advertisement by the first embodiment of the present invention.

FIG. 7 is a flowchart of the advertisement providing method according to the first embodiment of the present invention. According to the present providing method, the control unit 10 could execute a program deployed in the memory 11 of the advertisement analysis apparatus 1 to realize the process. The advertisement analysis apparatus 1 and another server or apparatus can also cooperate to perform this process in a distributed manner. Or another server or apparatus can execute this process independently.

First, the advertisement-related product management unit 21 of the control unit 10 of the advertisement analysis apparatus 1 determines an advertisement-related product related to the product to be advertised (S101). For example, in the example of the advertising product "seasoning A" related to the advertising ID "1" shown in FIG. 5, when the seasoning A is a seasoning used in Chinese cuisine using cabbage as an ingredient, the advertisement-related product management unit 21 determines the advertisement-related product as "cabbage" and manages it. In this step, the name of the product to be advertised can be used in a search as a key to identify the product used with the product to be advertised. Products related to the products to be advertised can be stored in a database in advance. In the latter case, this determination process can be omitted, or alternatively, a process for specifying an advertisement-related product can be used.

Subsequently, the supply prediction information analysis unit 22 of the control unit 10 of the advertisement analysis apparatus 1 refers to information related to supply prediction of advertisement-related products (S102, S103). This step can be single or multiple, depending on the information to be referred to as the information related to the supply prediction.

For example, in the above example, when the advertisement-related product is "cabbage", the supply prediction information analysis unit 22 first refers to the weather information (S102). Here, the supply prediction information analysis unit 22 refers to, for example, the weather information DB included in the supply prediction DB 2 illustrated in FIG. 1. The weather information DB is provided by, for example, a provider of the weather information. The advertisement analysis apparatus 1 may access the weather information DB via the network through the transmission/reception unit 13 and download the weather information. In addition, it can acquire necessary weather information via an API (Application Program Interface) provided by a weather information provider. The supply prediction information analysis unit 22 can store the acquired reference information as the advertisement-related product information 200 in the advertisement-related product information storage unit 31.

As the weather information, for example, in the example of the advertisement-related product "cabbage", information on the medium- and long-term weather that can affect the growth of cabbage can be used. In terms of the flow of cabbage growth, it takes about 1.5 months for cabbage from seed sowing to raising seedling, about 1 month for settled planting, about half a month from the beginning to early stage of heading, about a month for late stage of heading, and then the harvest begins. Since cabbage is susceptible to humidity during the seedling raising season, it is not preferable that rain continues. Moreover, the cabbage prefers a dry condition because it is vulnerable to excessive moisture even during the settled planting period. The proper temperature for the cabbage growth is about 15 to 20° C. for the period. Similarly, there is an appropriate temperature and humidity during the heading period, and thus the weather information including temperature and humidity has a great influence on the cabbage harvest time. In the example of cabbage, the weather information of Tsumagoi Village in Gunma Prefecture, which counts the maximum shipment volume in Japan, can be used as the target area of the weather information.

Subsequently, in the example of the advertisement-related product "cabbage", the supply prediction information analysis unit 22 refers to the image information (S103). Here, the supply prediction information analysis unit 22 refers to, for example, the image information DB included in the supply prediction DB 2 illustrated in FIG. 1. The image information DB is, for example, a satellite image of a cabbage field provided by a satellite operator. The advertisement analysis apparatus 1 accesses the image information DB via the network through the transmission/reception unit 13 and downloads weather information. In addition, it could acquire necessary image information via an API (Application Program Interface) provided by a satellite operator. The supply prediction information analysis unit 22 can store the acquired reference information as the advertisement-related product information 200 in the advertisement-related product information storage unit 31.

For example, in the example where the advertisement-related product is a "cabbage", image data of a cabbage field, which can predict the growth of cabbage, may be used as the image information. Specifically, it monitors the image of the field from the sowing of the target cabbage to growing and harvesting, determines the ratio of crops to soil at each stage from the image, detects NDVI (Normalized Difference Vegetation Index) transition, predicts the harvest/shipping timing of the target cabbage based on past image data and historical data such as harvest time. In the example of cabbage, the image information of Tsumagoi Village in Gunma Prefecture, which counts the maximum shipment volume in Japan, can be used as the target area of the image information.

Subsequently, the supply prediction information analysis unit 22 determines the supply prediction of the advertisement-related product based on the reference information included in the advertisement-related product information stored in the advertisement-related product information storage unit 31 (S104). In the above example of "cabbage", first, as reference information, it predicts cabbage harvest time from weather information, predicts cabbage harvest time from satellite image information, and determines the prediction of cabbage harvest time by integrating the weather information and the image information.

Figure 8:
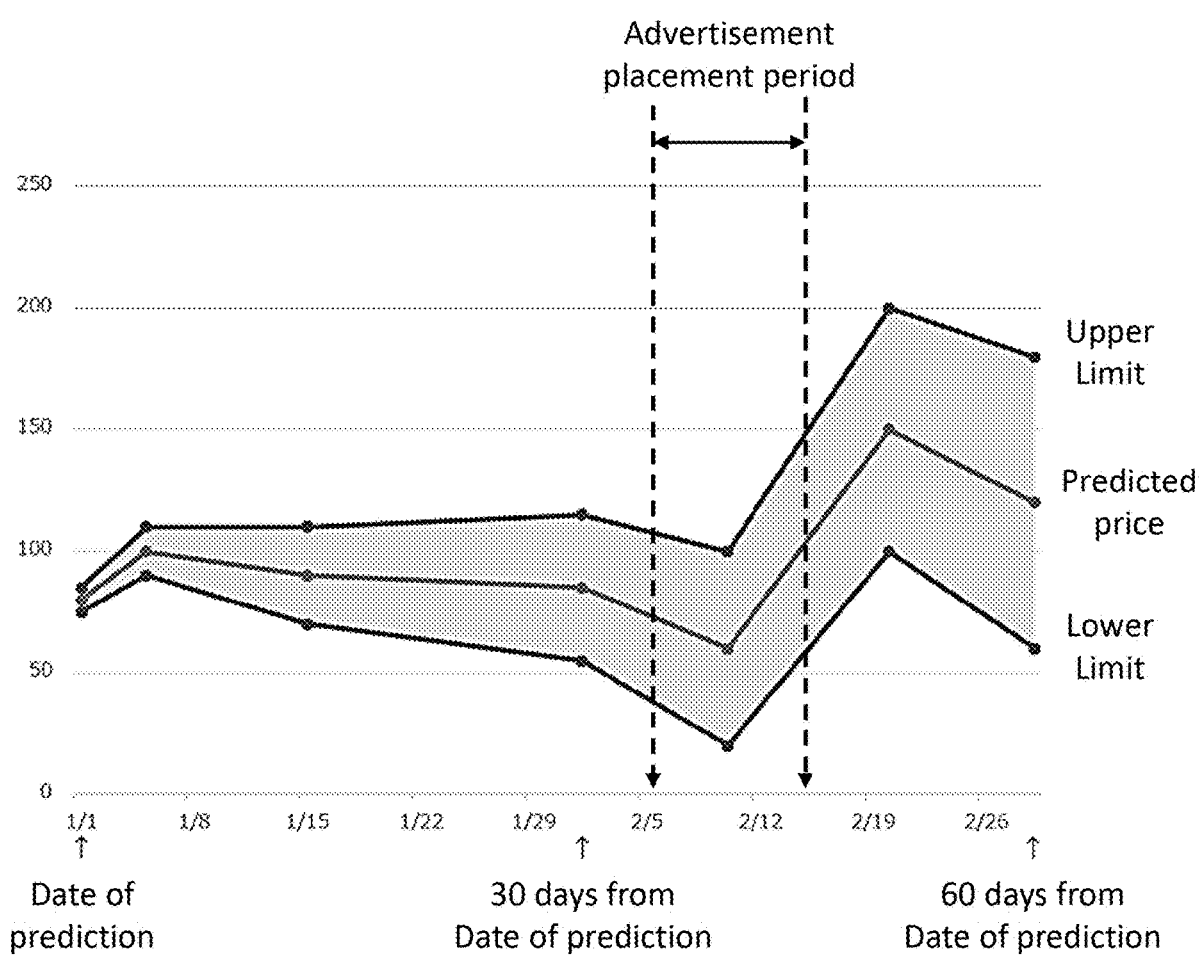
FIG. 8 is a conceptual diagram explaining a method to provide an advertisement by the first embodiment of this invention.

FIG. 8 illustrates a graph showing an example of cabbage supply prediction as an advertisement-related product. In the example of FIG. 8, the price prediction of the advertisement-related product "cabbage" is performed on January 1 over the medium to long term. The supply prediction information analysis unit 22 predicts the supply time of cabbage based on the referred image and weather information, and then predicts the price according to the supply time. That is, by deriving the supply time, it is possible to predict the supply amount of cabbage. As a result, it is possible to predict the price of cabbage in conjunction with the amount of supply of cabbage at that time. In addition, the upper limit of the predicted price can be predicted according to the range of shipping volume prediction. For the supply prediction of advertisement related goods, although it can be performed based on several reference information in order to improve the precision of the prediction as in this example, it can also be predicted based on single information. Further, it is possible to use one reference information to improve the other reference information's prediction accuracy. Such example is to use satellite image information to correct prediction based on weather information. In addition, although it is possible to predict the price of the advertisement-related product as in this example, it can also be limited to predicting the supply timing or the supply amount.

Then, the advertisement placement time determination unit 23 determines the advertisement placement time based on the supply prediction of the advertisement-related product (S105). For example, in the case of the advertisement product "seasoning A", the supply timing of the advertisement-related product "cabbage" can be predicted, so that the price of the cabbage can be predicted. Because consumers try to buy cabbage when the price is low, consumer demand can be predicted. And, for example, the advertising product "seasoning A" is a seasoning used for cooking Chinese cuisine with cabbage as an ingredient. Demand for seasoning A could also increase in conjunction with the increased demand for cabbage. Therefore, we can expect increased demand for the seasoning as a result of the advertisement by setting the time of placement of the TV commercial of the product to be advertised, "seasoning A", in accordance with the supply time of the advertisement-related product "cabbage".

In the example of FIG. 8, the advertisement placement time determination unit 23 sets the advertisement placement time to a time when the predicted price of cabbage is lowest (for example, one week starting from February 5). The advertisement placement time determination unit 23 stores the determined advertisement placement time in the advertisement information storage unit 32 as the advertisement information 200. The advertisement analysis apparatus 1 can provide the advertisement information 200 to other apparatuses such as an advertisement server. The advertisement information 200 includes a determined advertisement placement time such as recommendation information related to the placement time for a specific advertisement or the product to be advertised in general.

As described above, according to the present embodiment, when coupled with the demand for advertising-related product, the effectiveness of advertisement for the product to be advertised can be enhanced by predicting the demand for the product to be advertised based on the supply prediction of the advertisement-related product and by setting the advertisement placement time for the product to be advertised to match the supply time of the advertisement-related product.

Second Embodiment

Figure 9:
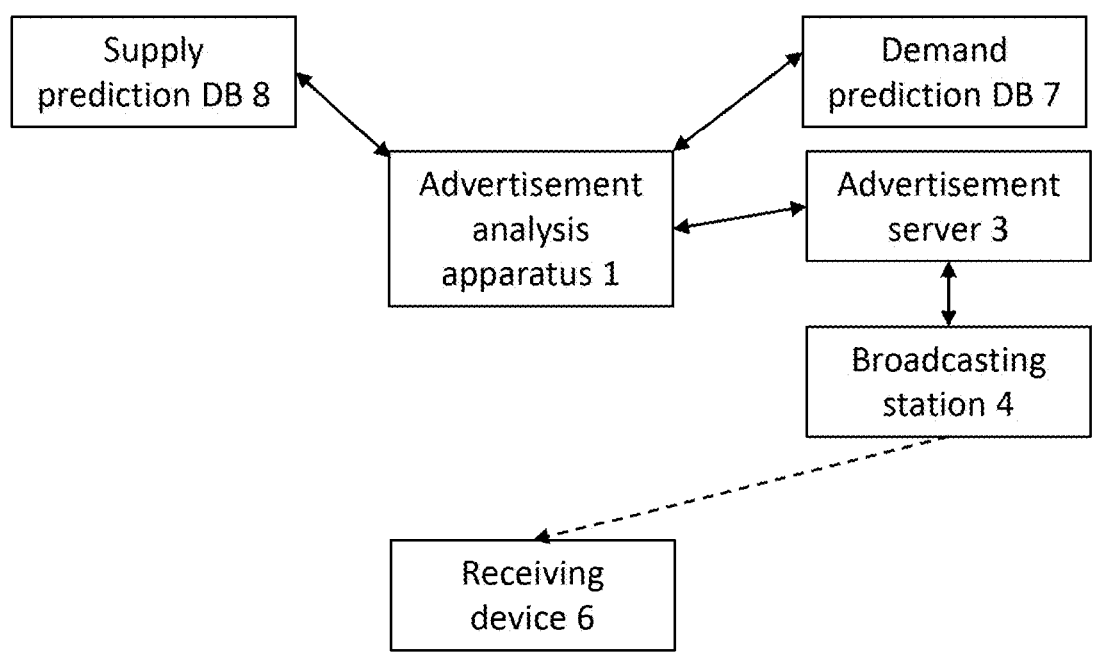
FIG. 9 is a block diagram of a system by a second embodiment of this invention.

Hereinafter, a method to provide television program advertisement according to a second embodiment of the present invention will be described with reference to the drawings. FIG. 9 is a configuration diagram of a television program advertisement providing system according to the second embodiment of the present invention. The present embodiment will be described by focusing on differences from the first embodiment, and description of other items that are the same as those of the first embodiment will be omitted.

As shown in FIG. 9, the system to provide an advertisement to a TV program is comprised of an advertising analysis apparatus 1; a demand prediction DB 7 that provides demand prediction information related to an advertisement-related product related to a product to be advertised such as TV commercials, which is connected to the advertisement analysis apparatus 1 via a network such as the Internet; a supply prediction DB 8 that provides supply prediction information related to an advertisement-related product; an advertisement server 3 that stores advertisement information for a TV program, which is connected to the advertisement analysis apparatus 1 via a network such as the Internet; a broadcasting station 4 is connected to the advertisement server 3 via a network such as the Internet and transmits a television program advertisement to a receiving device 5.

The system configuration according to this embodiment differs from the system according to the first embodiment in that the system includes a demand prediction DB 7 that provides demand prediction information related to the advertisement-related product in addition to supply prediction DB 8 that provides supply prediction information related to the advertisement-related product. The DB 8 corresponds with DB 2 in the system according to the first embodiment. Similar to the supply prediction DB 8, the demand prediction DB 7 may be provided outside the advertisement analysis apparatus 1, or various information may be held in a storage or the like inside the advertisement analysis apparatus 1. Further, for example, information on the inventory of products provided by distributors and retailers, information on consumers' demand of the products provided by marketing companies and the like can be considered as the demand prediction DB 7. Such information may be provided by the same business operator or may be provided by different business operators.

Figure 10:
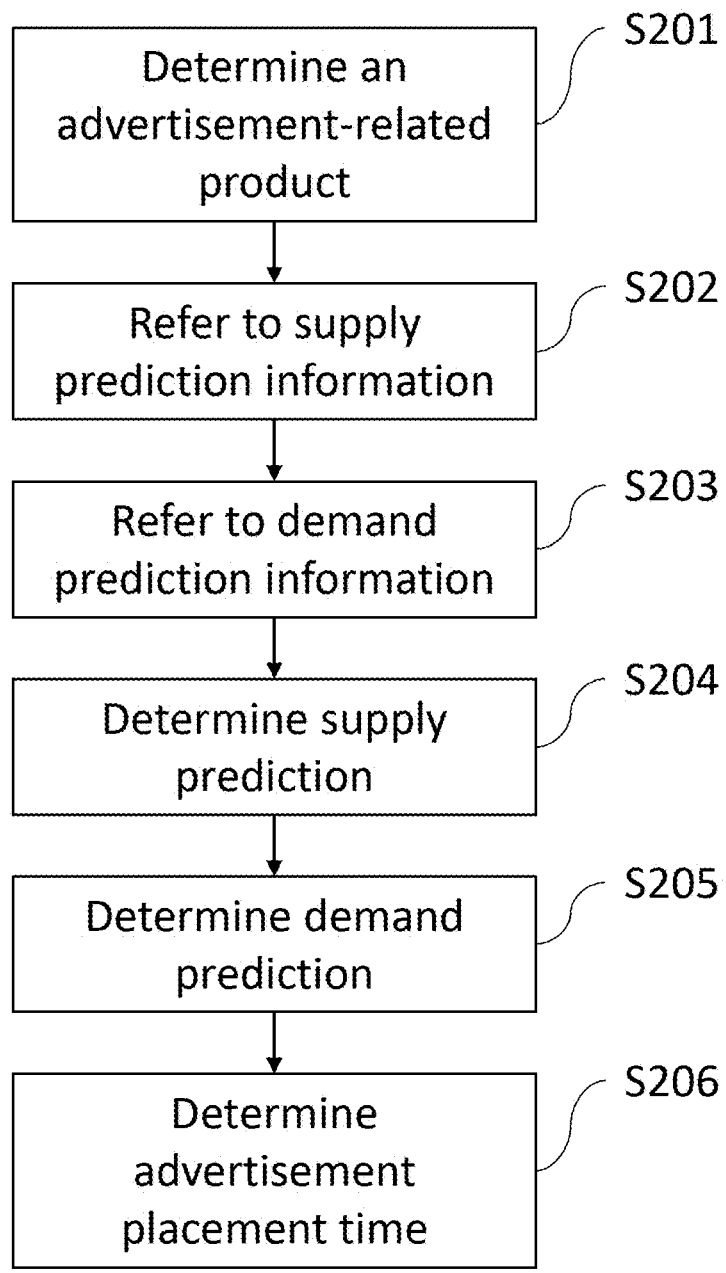
FIG. 10 is a flowchart of a method to provide an advertisement by the second embodiment of this invention.

FIG. 10 is a flowchart of the advertisement providing method according to the second embodiment of the present invention. According to the present providing method, the control unit 10 could execute a program deployed in the memory 11 of the advertisement analysis apparatus 1 to realize the process as in the first embodiment. The advertisement analysis apparatus 1 and another server or apparatus can also cooperate to perform this process in a distributed manner. Or another server or apparatus can execute this process independently.

First, the advertisement-related product management unit 21 of the control unit 10 of the advertisement analysis apparatus 1 determines an advertisement-related product related to the product to be advertised (S201). For example, in the example of the product to be advertised "seasoning A" related to the advertising ID "1" shown in FIG. 5, when the seasoning A is a seasoning used in Chinese cuisine using cabbage as an ingredient, the advertisement-related product management unit 21 determines the advertisement-related product as "cabbage" and manages it. In this step, the name of the product to be advertised can be used in a search as a key to identify a product used with the product to be advertised. The product related to the product to be advertised can be stored in a database in advance. In the latter case, this determination process can be omitted, or alternatively, can be used as a process for specifying an advertisement-related product.

Subsequently, the supply prediction information analysis unit 22 of the control unit 10 of the advertisement analysis apparatus 1 refers to information related to the supply prediction of the advertisement-related product (S202). Details of this step are similar to those described as S102 and S103 in the processing in FIG. 7 of the first embodiment, and a description thereof will be omitted.

Next, the demand prediction information analysis unit (not shown) of the control unit 10 refers to information related to the supply prediction of the advertisement-related product (S203). For example, in the above example, when the advertisement-related product is "cabbage", the demand prediction information analysis unit refers to information on inventory and price of the product, which is included in demand prediction DB 7, provided by the distributor or retailer. In the example of the advertisement-related product "cabbage", examples of the inventory information of merchandise include information on the inventory of cabbage held by retailers in each retail store, information on retail prices, and information on their transitions. The advertisement analysis apparatus 1 accesses each information DB via the network through the transmission/reception unit 13 and downloads information. In addition, it could acquire necessary information via an API (Application Program Interface) provided by each information provider. The demand prediction information analysis unit 22 can store the acquired reference information as the advertisement-related product information 200 in the advertisement-related product information storage unit 31.

Subsequently, the supply prediction information analysis unit 22 of the control unit 10 determines the supply prediction of the advertisement-related product based on the reference information included in the advertisement-related product information stored in the advertisement-related product information storage unit 31 (S204). In the above example of "cabbage", first, as reference information, it predicts cabbage harvest time from weather information, and predicts cabbage harvest time from satellite image information, and then determines the prediction of cabbage harvest time by integrating the weather information and the image information.

Subsequently, the demand prediction information determination unit (not shown) of the control unit 10 determines the demand prediction of the advertisement-related product based on the reference information included in the advertisement-related product information stored in the advertisement-related product information storage unit 31 (S205). In the above example of "cabbage", first, the demand prediction for cabbage can be determined from the inventory information and price information of cabbage at the retail store as reference information.

Then, the advertisement placement time determination unit 23 determines the advertisement placement time based on the supply prediction and the demand prediction of the advertisement-related product S205. For example, in the example of the product to be advertised "seasoning A", the time can be identified when the demand for cabbage may be highest by combining prediction of the price fluctuation based on the supply time prediction of advertisement-related product "cabbage" and prediction of consumer demand on cabbage based on the inventory and price provided by retail stores. Then, the advertisement commercial for "seasoning A" is set for the TV commercial in accordance with the time when the demand for the advertisement-related product "cabbage" is most expected.

As described above, according to the present embodiment, the advertising effectiveness on the product to be advertised can be enhanced by combining the supply prediction of the advertisement-related product used with the product to be advertised and the demand prediction for the advertisement-related product, and then by setting the advertising placement time for the product to be advertised when the demand for the advertisement-related product is most expected.

Third Embodiment

Figure 11:
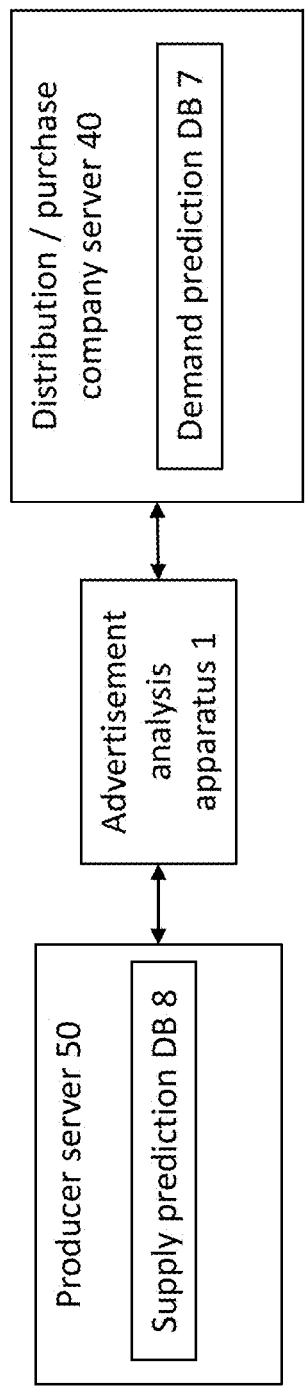
FIG. 11 a block diagram of a system by a third embodiment of this invention.
Figure 12:
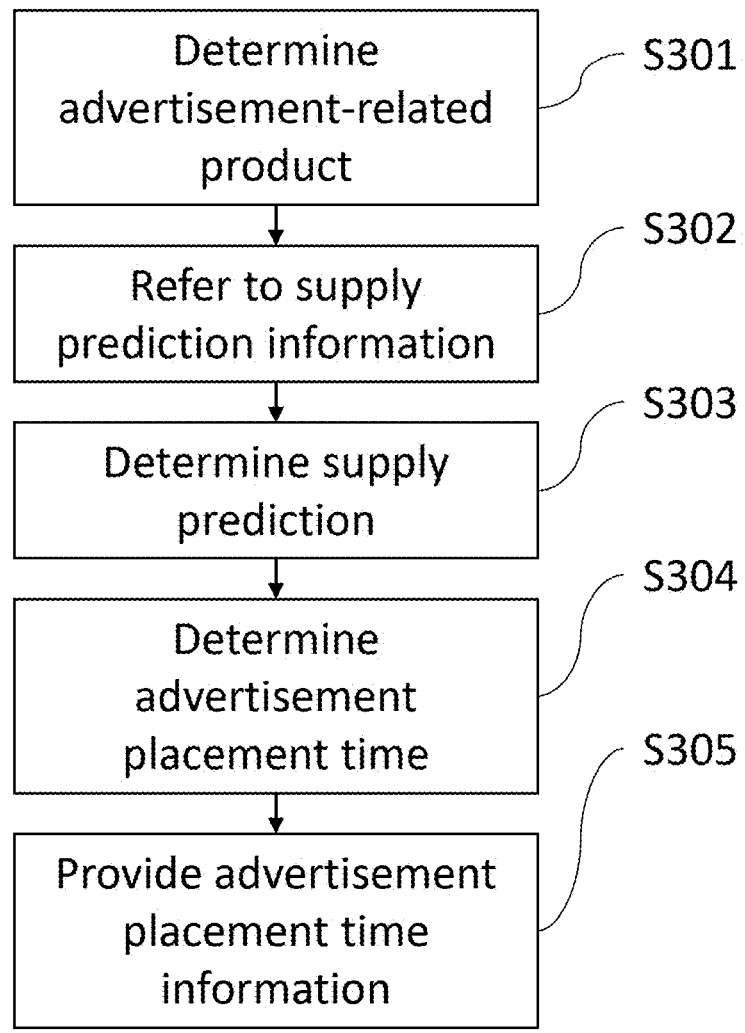
FIG. 12 is a flowchart of a method to provide an advertisement by the third embodiment of this invention.

Hereinafter, a method to provide a television program advertisement according to a third embodiment of the present invention will be described with reference to the drawings. FIG. 11 is a block diagram of a system to provide a television program advertisement according to the third embodiment of the present invention. Hereinafter, the present embodiment will be described by focusing on differences from the previous two embodiments, and description of items that are the same as those of the previous two embodiments will be omitted.

As shown in FIG. 11, the TV program advertisement providing system includes an advertising analysis apparatus 1; a distribution/purchase company server 50 which includes a demand prediction DB 7 providing demand prediction information related to an advertisement-related product related to a product to be advertised such as TV CM, which is connected to the advertising analysis apparatus 1 via a network such as the Internet; and a producer server 40 which includes a supply prediction DB 8 providing supply prediction information related to an advertisement-related product. Here, the producer server 40 and the distribution/purchase company server 50 can also have an external supply prediction DB and an external demand prediction DB, respectively.

In the system configuration according to the present embodiment, the difference from the system according to the previous two embodiments is that the distribution/purchase company server 40 and the producer server 50 are connected to the advertisement analysis apparatus 1 wherein the distribution/purchase company server 40 and the producer server 50 can provide the producer server 50 and the distribution/purchase company server 40 with information related to demand prediction and supply prediction regarding an advertisement-related product, respectively. As a result, a product value chain which includes production, advertising, distribution and sales can be configured wherein the advertisement analysis apparatus 1 that handles "advertisement" is positioned between the producer server 50 that handles "production" and the distribution/purchase company server 40 that handles "distribution/sales". That is, for an advertisement-related product (for example, cabbage) related to a product to be advertised (for example, seasoning for Chinese cuisine), the advertisement analysis apparatus executes planning of an appropriate timing for advertisement of the seasoning based on the cabbage supply prediction provided from the producer server, and further provides the information to the distribution/purchase company server 40. This enables the distribution/purchase company to carry out sales promotion activities for the seasoning in accordance with the timing.

FIG. 11 is a flowchart of the advertisement providing method according to the third embodiment of the present invention. The processing according to the present providing method is realized by, for example, executing a program deployed in the memory 11 of the advertisement analysis apparatus 1 in the control unit 10 as in the first embodiment. This process can be distributed in cooperation of the advertisement analysis apparatus 1 with another server or apparatus, or another server or apparatus can execute this process independently.

First, the advertisement-related product management unit 21 of the control unit 10 of the advertisement analysis apparatus 1 determines an advertisement-related product related to the product to be advertised (S301). For example, in the example of the product to be advertised "seasoning A" related to the advertising ID "1" shown in FIG. 5, when the seasoning A is a seasoning used in Chinese cuisine using cabbage as an ingredient, the advertisement-related product management unit 21 determines the advertisement-related product as "cabbage" and manages it. In this step, the name of the product to be advertised can be used in a search as a key to identify the product used with the product to be advertised. A product related to the product to be advertised can be stored in a database in advance. In the latter case, this determination process can be omitted, or alternatively, can be used as a process for specifying an advertisement-related product.

Subsequently, the supply prediction information analysis unit 22 of the control unit 10 of the advertisement analysis apparatus 1 refers to information regarding supply prediction of the advertisement-related product (S302). In the present embodiment, the reference destination of information related to supply prediction is the supply prediction DB 8 included in the producer server 50. Other details of this step are similar to those described as S102 and S103 in the processing in FIG. 7 of the first embodiment, and a description thereof will be omitted.

Subsequently, the supply prediction information analysis unit 22 of the control unit 10 determines the supply prediction of the advertisement-related product based on the reference information included in the advertisement-related product information stored in the advertisement-related product information storage unit 31 (S303). In the above example of "cabbage", first, as reference information, it predicts cabbage harvest time from weather information, predicts cabbage harvest time from satellite image information, and determines the prediction of cabbage harvest time by integrating the weather information and the image information.

Then, the advertisement placement time determination unit 23 determines the advertisement placement time based on the supply prediction of the advertisement-related product (S304). For example, in the case of the advertisement product "seasoning A", the supply timing of the advertisement-related product "cabbage" can be predicted, so that the price fluctuation of the cabbage is predicted and the time when the demand for cabbage is expected is specified. Then, timing for the TV commercial placement of the product to be advertised "seasoning A" is set in accordance with the time when the demand for the advertisement-related product "cabbage" is expected.

Then, the advertisement placement time transmission unit (not shown) of the control unit 10 transmits the advertisement placement time to the distribution/purchase company server 40 (S305). For example, in the example of the product to be advertised "seasoning A", the advertisement analysis apparatus 1 transmits the advertisement placement time of seasoning A to the distribution/purchase company server 40, so that the distribution/purchasing business operator can know the advertisement placement time of seasoning A and can secure the sales promotion expenses for seasoning A according to the advertisement placement time and can carry out the promotion activities.

Moreover, in the modification of this embodiment, via the advertisement analysis apparatus 1, the information related to the supply prediction of the advertisement-related product of the product to be advertised can be provided from the producer server 50 to the distribution/purchase company server 40 and the information related to the demand prediction of the related product of the product to be advertised can be provided from the distribution/purchasing company server 40 to the producer server 50. Accordingly, the producer server 50 can adjust the supply amount of the product based on the demand prediction related to the advertisement-related product, and the distribution/purchase company server 40 can adjust the sales volume of the product based on the supply prediction related to the advertisement-related product (and the product to be advertised). Further, the advertisement analysis apparatus 1 determines the value chain of the product to be advertised from production, advertising and sales based on the supply/demand prediction information of advertisement-related product obtained from both the producer server 50 and the distribution/purchase company server 40, maximizing the advertising effectiveness of the product to be advertised. The advertisement analysis apparatus 1 could suggest information regarding the optimal product shipment time for the producer and the optimal product sales time for the distribution/purchasing company.

As in the present embodiment, an advertising business operator can cooperate with an external partner to predict market supply and demand, maximizing the advertising effect of the product to be advertised by predicting market supply and demand. The number of reach of advertisements to viewers and the recognition of the product to be advertised have been conventionally considered as an index for measuring the advertising effect. In the present embodiment, the purchase environment can be taken into consideration in addition to the above index. The purchasing environment can also be expressed by a coefficient value such as a purchasing demand coefficient. The purchasing environment can be considered that it has improved by carrying out promotional activities of the product to be advertised linked to the advertising placement timing of the product to be advertised.

As described above, according to the present embodiment, a production company, an advertising company, and a distribution/purchase company could configure a value chain and share an advertisement placement time of a product to be advertised in a timely manner on a distribution/purchase server. As a result, the distribution/purchasing company can carry out sales promotion activities in accordance with the advertisement placement time of the product to be advertised. Thereby, the advertising effect of the product to be advertised can be maximized in the entire value chain.

As mentioned above, the TV program advertisement providing method has been described in the first to third embodiments. These inventions can be applied to other advertisement forms such as radio advertisement, web advertisement, and digital signage advertisement. In the case of a radio advertisement, the receiving device 5 in FIG. 1 can be a radio receiver that receives radio broadcast waves from a radio broadcasting station. In the case of Internet radio, the receiving device 5 can be a PC, a smartphone, a tablet, or the like connected to a media server that distributes IP simulcast of a radio program via the Internet or the like. In the case of a web advertisement, the receiving device 5 in FIG. 1 may be a PC, a smartphone, a tablet, or the like connected to the advertisement server 3 via the Internet or the like. In the case of a digital signage advertisement, the receiving device 5 may be a digital signage display device such as a plasma display, an LCD, an LED, a VFD, or a video projector connected to the advertisement server 3 via the Internet or the like. By appropriately predicting the supply of the related product of the product to be advertised and determining the advertisement placement time of the product to be advertised, the radio advertising, web advertising or digital signage advertising content of the product to be advertised is transmitted to each corresponding receiving device. These advertisings can be displayed or played at the receiving device. This makes it possible to display the advertisement more flexibly in real time with respect to the display timing and timing of the advertisement as compared with the television advertisement.

The above-described embodiments are merely examples for facilitating understanding of the present invention and are not intended to limit the present invention. The present invention can be changed and improved without departing from the gist thereof, and it is needless to say that the present invention includes equivalents thereof.

EXPLANATION OF REFERENCES

1 Advertising analysis apparatus
2, 8 Supply prediction DB
3 Advertisement server
4 Broadcasting station
5 Receiving device
7 Demand prediction DB
40 Distribution/purchase company server
50 Producer server

What is claimed is:

1. A method for providing an advertisement for a target product, comprising:

determining an advertisement-related product related to the target product;

referring to supply prediction information of the advertisement-related product; and determining a placement time of the advertisement for the target product based on the supply prediction information, wherein the advertisement-related product is a product to be used with the target product and is not a product to be advertised.

2. The method for providing an advertisement for a television program according to claim 1, wherein the supply prediction information includes information related to price prediction of the advertisement-related product.

3. The method for providing an advertisement for a television program according to claim 1, wherein the supply prediction information includes information related to a shipping time of the advertisement-related product.

4. The method for providing an advertisement for a television program according to claim 1, wherein the supply prediction information is generated based on reference information.

5. The method for providing an advertisement for a television program according to claim 4, wherein the reference information is either weather information or satellite image information.

6. The method for providing an advertisement for a television program according to claim 1, wherein the advertisement-related product is an ingredient.

7. The method for providing an advertisement for a television program according to claim 1, wherein the advertisement-related product is a farm product.

8. The method for providing an advertisement for a television program according to claim 4, wherein the reference information is weather information, and the weather information refers to satellite image information.

* * * * *